United States Patent
Benni et al.

(10) Patent No.: US 9,396,422 B1
(45) Date of Patent: Jul. 19, 2016

(54) METHODS AND SYSTEMS FOR LOCALIZING AZTEC CODES

(71) Applicant: XEROX CORPORATION, Norwalk, CT (US)

(72) Inventors: Vijeetkumar Benni, Bangalore (IN); Punitha Puttuswamy, Bangalore (IN)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/945,464

(22) Filed: Nov. 19, 2015

(51) Int. Cl.
 *G06K 7/10* (2006.01)
 *G06K 19/06* (2006.01)

(52) U.S. Cl.
 CPC .... *G06K 19/06037* (2013.01); *G06K 19/06131* (2013.01)

(58) Field of Classification Search
 CPC ............... G06K 19/06037; G06K 7/10722; G06K 7/1417; G06K 7/1456; G06K 7/1473
 USPC .................. 235/462.08–462.1, 494
 See application file for complete search history.

(56) References Cited

U.S. PATENT DOCUMENTS

| 5,591,956 | A | 1/1997 | Longacre, Jr. et al. |
| 8,550,351 | B2 * | 10/2013 | Sun .......................... G06K 7/14 235/462.1 |
| 8,720,781 | B2 * | 5/2014 | Wang ................. G06K 7/10732 235/462.11 |
| 8,998,092 | B2 * | 4/2015 | Gao ................... G06K 7/10722 235/454 |
| 9,111,186 | B2 * | 8/2015 | Blasinski ........... G06K 19/0614 |
| 2012/0145779 | A1 * | 6/2012 | Bietenbeck ....... G06K 19/06037 235/375 |

* cited by examiner

*Primary Examiner* — Seung Lee

(57) ABSTRACT

Some embodiments are directed to a system, an apparatus, and a method for automatically detecting and localizing Aztec barcodes in noisy and low-resolution images. The disclosed method detects Aztec barcodes having a resolution of less than two pixels. The disclosed method can process a gray image that is subjected to a coarse localization process in which the barcode region is segmented from the image consisting of other contents like text, graphics, etc. The localized and segmented barcode is then processed separately to locate the encoded data in the Aztec barcode by considering unique Aztec patterns in the barcode.

22 Claims, 8 Drawing Sheets

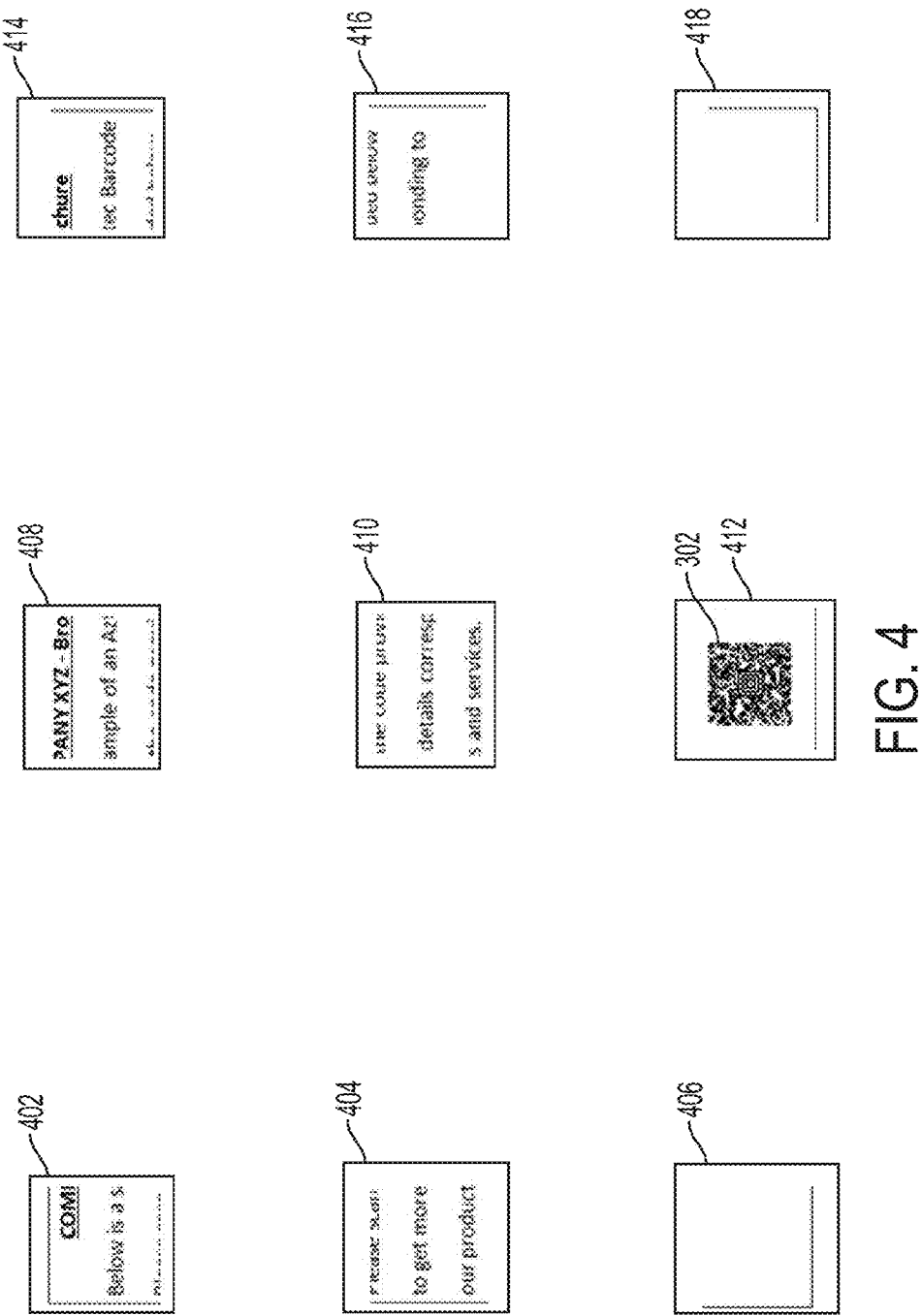

FIG. 6

METHODS AND SYSTEMS FOR LOCALIZING AZTEC CODES

TECHNICAL FIELD

The disclosed subject matter relates to methods and systems for localizing Aztec codecs. More particularly, the disclosed subject matter relates to image processing techniques, such as methods and systems for processing images that include detecting the presence of an Aztec code in an image.

BACKGROUND

An Aztec code is a type of two-dimensional barcode invented by Andrew Longacre, Jr. and Robert Hussey in 1995. The Aztec code is named after an Aztec pyramid having a resemblance to a central finder pattern. The finder pattern includes a center square and a predefined number of concentric squares around the center square. If the center square is enclosed by two thick black concentric squares, it is known as a compact Aztec barcode. If there are three thick black squares around the center square, then it is known as a full Aztec barcode. The square enclosing the finder pattern with smaller squares externally protruding from each of the corners is used as configurations to encode the data, such as a size of a symbol and length of a message encoded in the Aztec barcode. Actual information is encoded beyond the finder pattern squares in form of data blocks that are organized in layers/squares around the finder pattern. The data blocks are read in sequence within layers.

Aztec code uses less space than other matrix barcodes as it does not need a surrounding quiet zone (white space). The smallest Aztec code symbol is 15×15 modules square, and the largest Aztec code symbol is 151×151. The smallest Aztec code symbol encodes 13 numeric or 12 alphabetic characters, while the largest Aztec code symbol encodes 3832 numeric or 7067 alphabetic characters, or 1914 bytes of data. Module size in terms of pixels can vary for different Aztec barcodes depending on the resolution at which the Aztec barcodes are scanned. However, if module size of an Aztec barcode is less than two pixels, then complexity of processing and encoding such Aztec barcode becomes more challenging.

Even though localization or detecting the Aztec barcode is intended to be fast and simple because of the finder pattern (bull's eye) present at the center of the barcode, detecting barcodes from images using hand held devices can be particularly challenging when the barcode pixel resolution is low or the pattern distorted. Moreover, when the image of the Aztec barcode is captured in low resolution, noise is added to the captured image that makes the Aztec barcode unrecognizable and undetectable to a handheld device, especially when the barcode resolution is less than two pixels, i.e., the minimal module size is less than two pixels.

Therefore, there exists a need for detecting and localizing two-dimensional Aztec codes in noisy and/or low-resolution images. Further, there is a need for systems, methods, and apparatuses that are capable of detecting Aztec codes from low-resolution images having artificial noise and other interfering data.

SUMMARY

It may, therefore, be beneficial to provide a method to effectively process an image for detecting an Aztec code. For example, it may be beneficial to provide a method that can include segmenting the image into plurality of image segments of equal size, analyzing the plurality of image segments to determine image segments having higher percentage of dark color regions, merging the determined image segments together to form a segmented image, masking the segmented image by plurality of masks to obtain plurality of gradient images, processing the plurality of gradient images to widen separation between dark color pixels and light color pixels, merging the processed gradient images together to form a processed image, reducing pixel intensity of the processed image to form a normalized image having pixel intensity equivalent to any of the gradient image, and analyzing the normalized image to identify the Aztec code.

It may also be beneficial to provide an electronic device for capturing and processing an image to identify an Aztec code in the captured image. For example, it may be beneficial to provide an electronic device that includes a processor and a memory. The memory can include instructions, which when executed by the processor, cause the processor of the electronic device to segment the captured image into plurality of equal size image segments. The instructions can further cause the processor to analyze the plurality of image segments for determining image segments having higher percentage of dark color regions therein. The instructions can further cause the processor to merge the determined image segments together for forming a segmented image. The instructions can further cause the processor to mask the segmented image by plurality of masks for obtaining plurality of gradient images. The instructions can further cause the processor to process the plurality of gradient images for widening separation between dark color pixels and light color pixels. The instructions can further cause the processor to merge the processed gradient images together for forming a processed image. The instructions can further cause the processor to reduce pixel intensity of the processed image for forming a normalized and binarized image having pixel intensity equivalent to any of the gradient image. The instructions can further cause the processor to analyze the normalized and binarized image for identifying the Aztec code.

It may also be beneficial to provide a computer-readable medium containing programming instructions for processing an image to detect an Aztec code. Such programming instructions, when executed, can cause a processor of an electronic device to segment the captured image into plurality of equal size image segments. The instructions, when execute, can further cause the processor to analyze the plurality of image segments for determining image segments having higher percentage of dark color regions therein. The instructions, when executed, can further cause the processor to merge the determined image segments together for forming a segmented image. The instructions, when executed, can further cause the processor to mask the segmented image by plurality of masks for obtaining plurality of gradient images. The instructions, when executed, can further cause the processor to process the plurality of gradient images for widening separation between dark color pixels and light color pixels. The instructions, when executed, can further cause the processor to merge the processed gradient images together for forming a processed image. The instructions, when executed, can further cause the processor to reduce pixel intensity of the processed image for forming a normalized image having pixel intensity equivalent to any of the gradient image. The instructions, when executed, can further cause the processor to analyze the normalized image for identifying the Aztec code.

Some of the embodiments can provide a number of advantages depending on a particular configuration. Some of the other embodiments overcome challenges in detecting Aztec barcodes when an image is captured at low resolution by using image processing techniques. In one embodiment, a method can detect concentric squares at the center of the barcode, which is a unique feature of the Aztec barcode. Benefits of the some embodiments of the disclosure include abilities to detect Aztec barcodes having minimum structural element (i.e., module) size with a resolution less than two pixels.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 4 illustrates an embodiment of performing coarse segmentation process on a low-resolution image comprising an Aztec code, in accordance with an embodiment of the present invention;

FIG. 6 illustrates various masks used to obtain silhouette of concentric squares of an Aztec code, in accordance with the disclosed subject matter;

DETAILED DESCRIPTION

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

DEFINITIONS

In various embodiments, definitions of one or more terms that will be used in the document are described below. The term "Aztec Code" defines a two-dimensional matrix symbology containing dark and light square data modules. The Aztec code symbol has a finder pattern of concentric square rings centered on a single dark module located in the center of the symbol. A two-dimensional imaging device is necessary to scan the symbology. The term "image" refers to any image that comprises at least one Aztec code and may also comprise other data such as text, graphics, and like. The term "segmentation" of image refers to division of an image into plurality of smaller images that may or may not be of equal size and shape. The term "reference grid pattern" refers to a sequence pattern of alternate black and white pixel scan-line, starting from a common centroid and spanning in all four directions. Reference grid pattern is part of information encoded in the Aztec code and is used to identify the Aztec code.

DESCRIPTION

Figure 1:
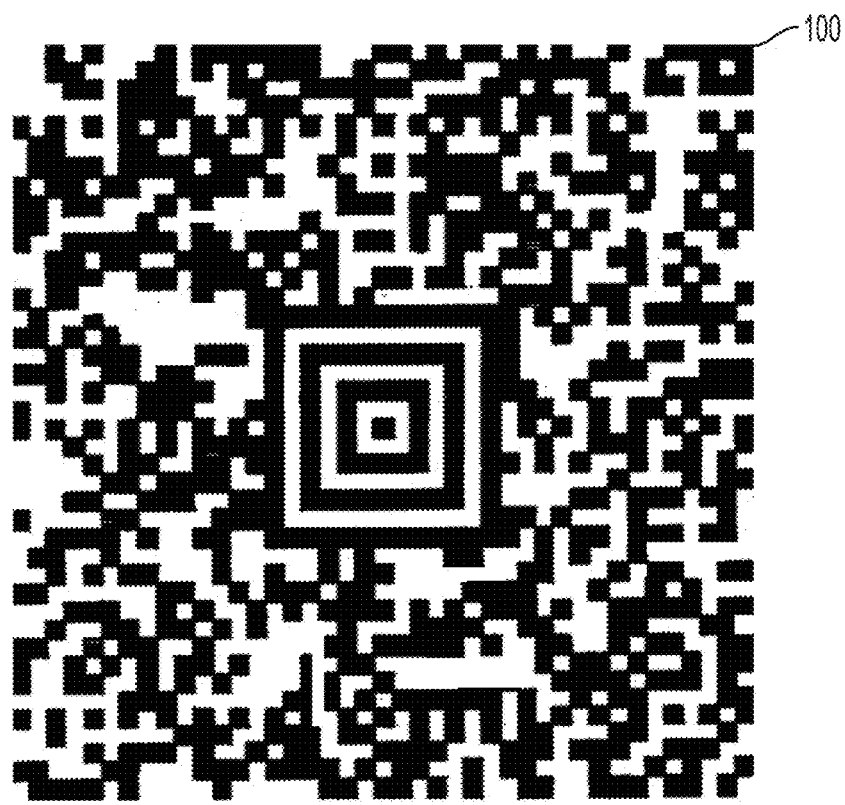
FIG. 1 illustrates a representative example of a two-dimensional Aztec bar code symbol, in accordance with the disclosed subject matter.

FIG. 1 illustrates a representative example of a two-dimensional (2D) Aztec bar code symbol 100, in accordance with the disclosed subject matter. The Aztec bar code symbol 100 has a nominally square shape and is located entirely within a square space having corners, as illustrated clearly in FIG. 1. Unlike other 2D bar code symbols, Aztec bar code symbol 100 has no printed lines or other patterns along any of its outer edges or corners other than marks that form a part of an encoded message. Such lines or other marks are known as reference grid. This reference grid is surrounded by a data structure/field (illustrated more clearly via different layers, e.g., layer 1-6, in FIG. 2, which is another representation of the Aztec bar code symbol 100) comprising message and other data encoded therein, in accordance with a coding scheme that is well known in the art.

It will be understood that the appearance of Aztec bar code symbol 100 depends on the data encoded therein. As a result, an Aztec bar code symbol 100 which contains the same amount of data as the symbol shown in the FIG. 1, but which has a different data content, will have an appearance which is different from that of the symbol shown in the FIG. 1. More details corresponding to the reference grid and data stored in the Aztec bar code symbol are explained in conjunction with FIG. 5 of the present invention.

Figure 2:
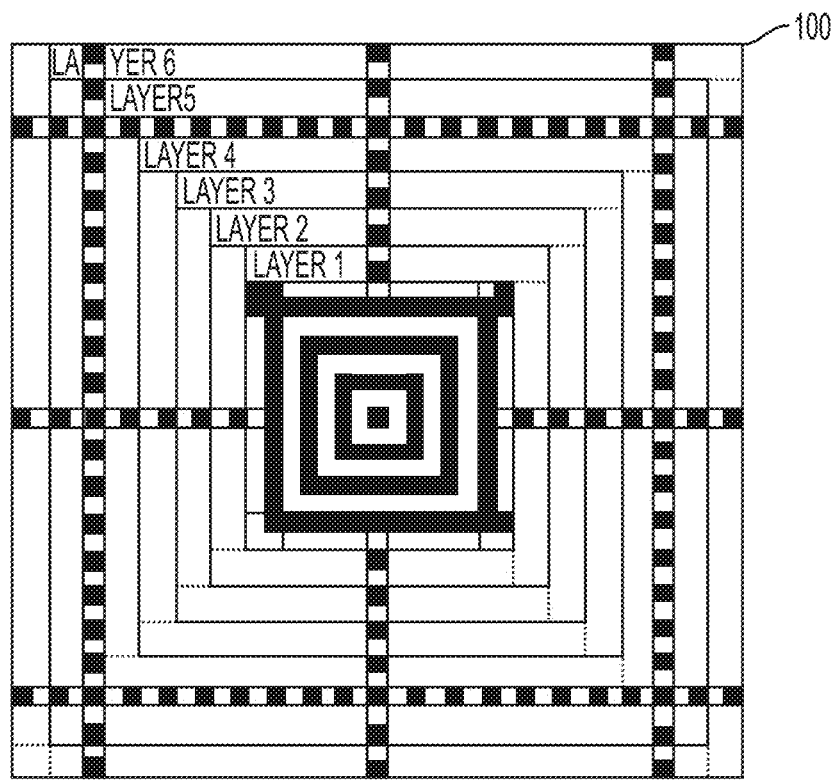
FIG. 2 illustrates data blocks and data layers comprised by an Aztec code symbol, in accordance with the disclosed subject matter.

Overall scheme for packing data blocks into the Aztec bar code symbol 100 according to the symbology of the disclosed matter is most clearly shown in FIG. 2, which illustrates boundaries of the layers of data blocks in solid lines (even though such solid lines do not appear in the printed form of the symbol). FIG. 2 basically illustrates a version of FIG. 1, which shows the structure of the layers within which data is entered into the Aztec bar code symbol 100. Further, as known in the art, the data stored in the data space of the symbology of the disclosed matter is of two kinds, message data and check data (also known as "checkwords") that are joined together into a string of data blocks and read out in a sequence.

It will be obvious that the order and direction in which the string is first printed and then read is not fundamentally important so long as that order and direction are used and interpreted consistently. With all such data stored in memory, the apparent differences between such directions merely reflect whether successive addresses are generated by incrementing or decrementing earlier addresses. Details corresponding to how the present invention leverages the use of Aztec bar code symbols by detecting the codes from even the lowest resolution images, is disclosed further in conjunction with FIGS. 3-8 of the disclosed subject matter.

Figure 3A:
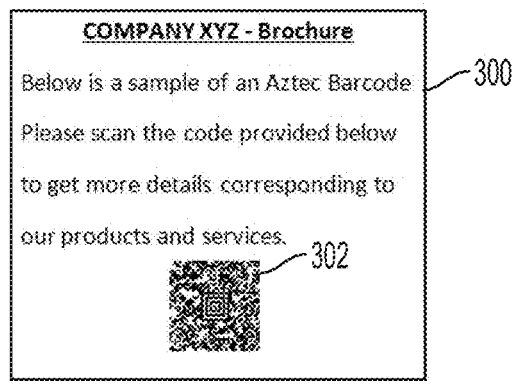
FIGS. 3A-3C illustrate a process of detecting and processing Aztec bar codes from low resolution images for correctly and precisely interpreting data encoded therein, in accordance with an embodiment of the disclosed subject matter.
Figure 3B:
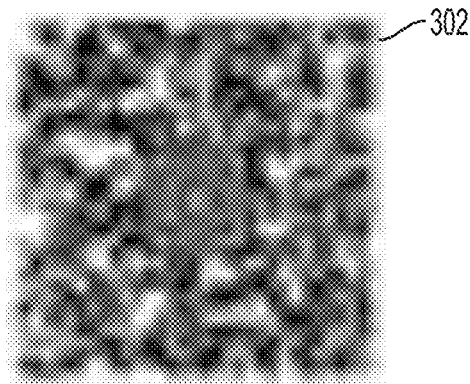
Figure 3C:
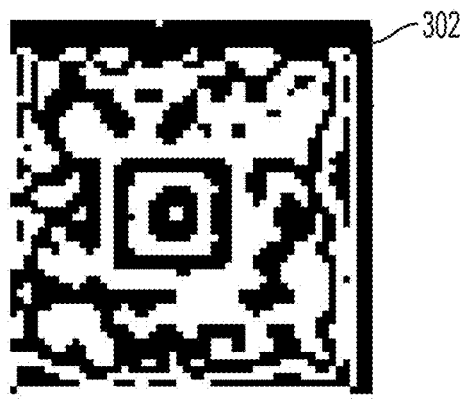

FIGS. 3A-3C illustrate a process of detecting and processing Aztec bar codes from low resolution images for correctly and precisely interpreting data encoded therein, in accordance with an embodiment of the disclosed subject matter. FIG. 3A illustrates a low resolution image 300 (an input image) comprising an Aztec bar code 302. FIG. 3B illustrates the pixilated low resolution image of the Aztec bar code 302 (localized image) detected and retrieved from the low resolution image 300 for further processing and analysis. FIG. 3C illustrates a processed form (binarised image) of the pixilated low resolution image of the Aztec bar code 302 that is retrieved by leveraging the disclosed subject matter.

The disclosed subject matter, principally, discloses a unique method of processing a low resolution image comprising a low resolution Aztec code, which is not interpretable by the present state of art solutions (due to un-detectable and low resolution of the Aztec code). In an embodiment, the unique method comprises steps for performing coarse segmentation, pre-processing, and normalization processes on to the low-resolution image for identifying and interpreting the Aztec code present therein. More details on how the method steps are performed are disclosed further in conjunction with FIGS. 4-8 of the disclosed subject matter.

FIG. 4 illustrates nine images (image 402, 404, . . . 418) that are derived from the image 300, as illustrated in FIG. 3. Principally, the FIG. 4 illustrates one embodiment of performing coarse segmentation process on a low resolution image (e.g., image 300 of FIG. 3) comprising an Aztec code (e.g., Aztec code 302). In an embodiment, as illustrated in FIG. 4, the image 300 is considered to be of size 60×60 units size, which is divided into nine zones of sizes 20×20, illustrated by images 402-418. This image division step is required as a part of detection/identification process for detecting/identifying presence of an low resolution Aztec code (e.g., code 302) in a low resolution image (e.g., image 300).

It will be appreciated by a person skilled in the art that the FIG. 4 illustrates an ideal case where a complete Aztec code is captured by a single image zone (e.g., image zone 412), as the image was considered to be of size of 60×60 units for ease of understanding only. However, in certain scenarios, a complete Aztec code may be captured by more than one image zones, which may need further processing to consolidate the complete Aztec code (more details on this embodiment is provided further in conjunction with FIGS. 5-8 of the present invention).

In an embodiment, after division of a low resolution image into plurality of image zones of image size 20×20 units, each image zone may be analyzed individually to detect a ratio of white to black for determining whether the ratio is greater than 25-30%. In case, the ratio is greater than 25-30%, the analyzed zone may be considered as a potential zone for comprising at least one part of the Aztec bar code. Otherwise, the analyzed zone may be discarded from further consideration. More details on the aforementioned process is detailed further in conjunction with FIGS. 5-8 of the disclosed subject matter.

Figure 5:
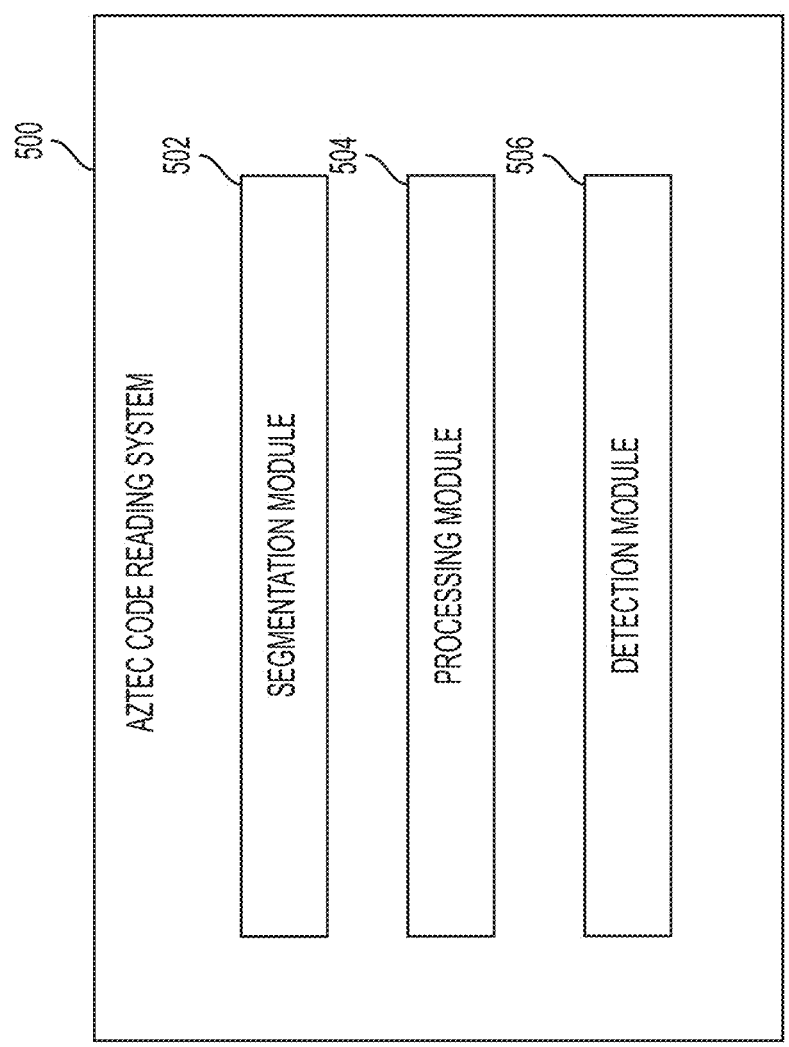
FIG. 5 illustrates an exemplary block diagram of an Aztec code reading system used for processing low-resolution images having at least one Aztec code, in accordance with the disclosed subject matter.

FIG. 5 illustrates an exemplary block diagram of an Aztec code reading system 100 used for processing low resolution images having at least one Aztec code, in accordance with the disclosed subject matter. The Aztec code reading system 100 may be installed in any electronic device, such as, but not restricted to a, cell phone, smart-phone, digital camera, PDA, tablet, laptop, desktop computer, and like. Further, the Aztec code reading system 100 may be a software, hardware, firmware, or combination thereof. The Aztec code reading system 100 may be configured to capture an image of an Aztec code, localize the Aztec code in the image, and process the Aztec code in real time. The Aztec code reading system 100 may also be configured to receive an image having the Aztec code for localizing and processing the Aztec code.

As shown in the FIG. 5, the Aztec code reading system 100 comprises three different modules, for example, a segmentation module 502, a processing module 504, and a detection module 506. In an exemplary embodiment, the functioning of the Aztec code reading system 100 is broadly divided into three stages. The stages are coarse segmentation, pre-processing, and Aztec barcode detection stage. Functions performed under the three stages, for example, coarse segmentation, pre-processing, and Aztec barcode detection stage are configured in the three modules of the Aztec code reading system 100, for example, segmentation module 502, processing module 504, and detection module 506, respectively.

It may be appreciated by a person skilled in the art that illustration of the Aztec code reading system 100 having different modules is provided only for the purpose of explanation and to enable a person skilled in the art to conceive the disclosed embodiments with ease. In no manner, the illustration is to be considered as narrowing factor of the present embodiments. A person skilled in the art may reduce the disclosed embodiments into practice without use of any modules or by using less or more number of modules that are disclosed herein.

The segmentation module 502 is configured to receive an image having at least one Aztec code. In an embodiment, the received image can be a gray scale image. If the received image is not a gray scale image, then the Aztec code reading system 100 may be used to convert the received image into a gray scale image for further processing by the segmentation module 502. Further, the gray scale image received by the segmentation module 502 may have at least one Aztec code therein along with other content, such as text, graphics, and like. For identifying the Aztec code in the received image, the segmentation module 502 can include steps to localize the Aztec code and separate the image area that has the highest probability of having the Aztec code.

The segmentation module 502 can perform a coarse segmentation process using a zonal method, which works based on darker domination. More specifically, the received image is divided into 20×20 zones, i.e., each zone may be of size 20 units wide and 20 units high. Further, a ratio of white to black pixels is calculated in each zone. If any zone has more than a threshold percent of black region, for example, a 25-30 percent of black region, then that region may be potentially considered having the Aztec barcode. Further, based on coherent and adjacent property, all the zones identified as potential barcode regions are merged together. The merged image region is the segmented barcode region, which is sent to the next stage for further analysis by the processing module 504.

The functioning of the processing module 504 may be divided into three different stages of smudge elimination, gray level separation, and normalization. The processing module 504 can be configured to process the merged image received from the segmentation module 502 to remove image noise, such as smudges, and to make the black and white pixels of the merged image more prominent for detection. These processes are required for distinctively identifying Aztec codes within low-resolution images. In an example of a low-resolution image, the module size of the Aztec code is less than two pixels.

Figure 6:
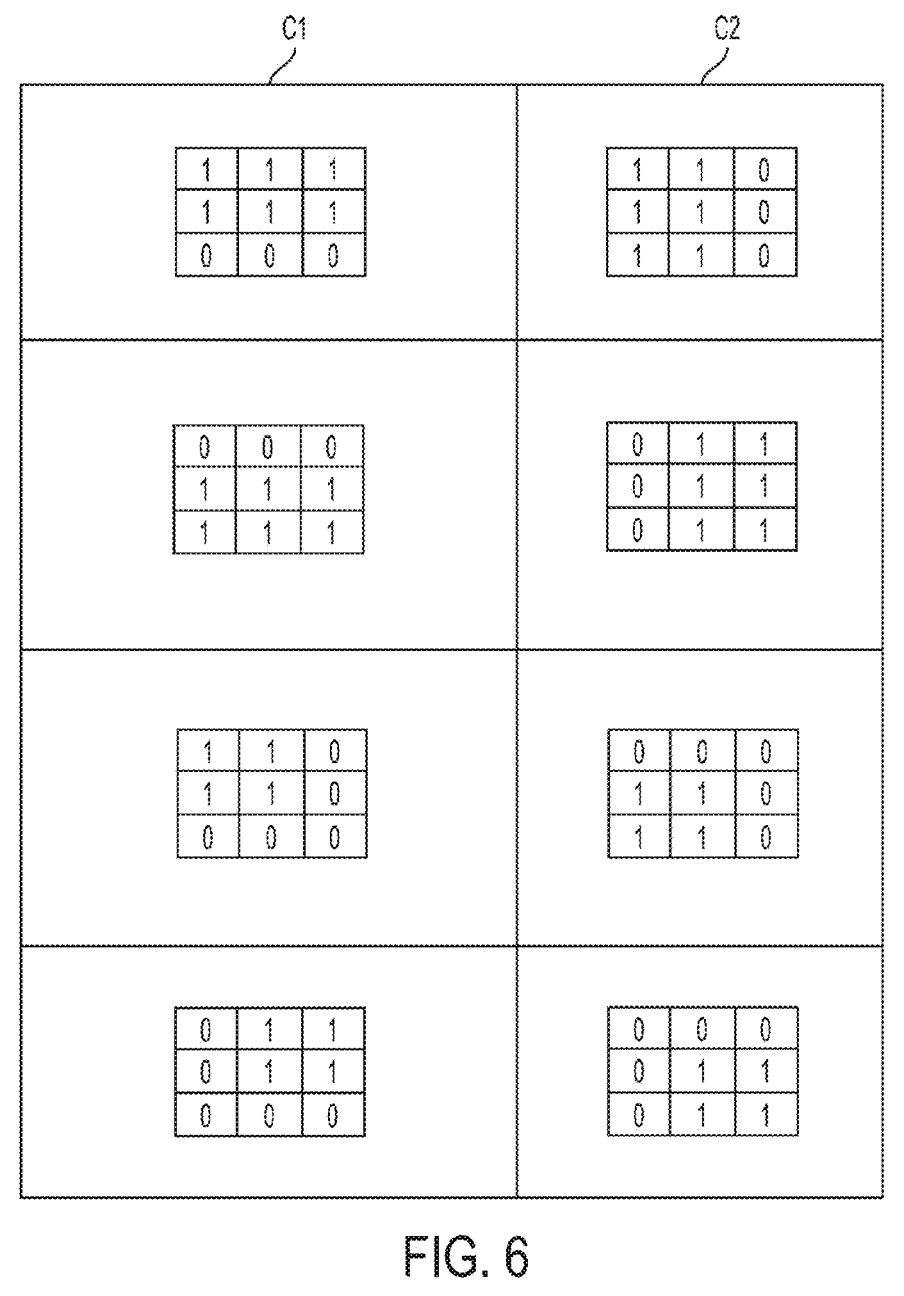

At the second stage of the processing module 504, smudge elimination can be accomplished using the segmented image received from the segmentation module 502 that is inverted for further processing. This step is performed for clearly localizing concentric squares of the Aztec code as white instead of black. Further, to eliminate the smudges, four different masks in both horizontal and vertical directions are convoluted with the intensity inverted/negated segmented region. The masks used to obtain vertical/horizontal edges along with the four corners are illustrated in FIG. 6, column 1 (c1) and column 2 (c2). When the masks (as shown in FIG. 6)

are applied on the received image, the prominent edges are obtained and the smudges are eliminated. This stage produces four gradient images.

In the next stage of gray level separation, the gradient images are enhanced by increasing separation between the whitish (lighter) and blackish (darker) gray levels, i.e., the gray value nearer to black is enhanced towards black and the gray value nearer to white is enhanced further towards white. To achieve this, the histograms for all four gradient images are computed. Let H1, H2, H3 and H4 denote the histograms computed for the gradient images. From these histograms, first maxima and second maxima for each histogram is computed. Further, it is ensured that the two maxima's are not situated on the same peak, and are at considerable distance to be the representative of the two different peaks in the histogram.

Once the aforementioned maxima's are computed, lowest point of the histogram curve lying in between the two maxima is determined, which is considered to be the minima point. If the intensity value of the input gradient image is less than minima, the pixel intensity is further reduced by a constant 't' (t is any arbitrary value). However, if the intensity is greater than the minima, the intensity is further increased by value t. This process widens separation between the whitish pixels and the blackish pixels, providing a greater discrimination to the white and black content of the pixels.

Further, the aforementioned process is repeated on all the four gradient images obtained in the previous stage. The enhanced gradient images are then added together to obtain a single image 'S'. The addition process may be a straightforward matrix addition. Furthermore, as the enhanced gradient image is still a gray-scale image, with the intensity values ranging from 0-255, adding all four enhanced gradient images may scale-up the intensity values of 'S' to a range 0-1023. Therefore, there is a need to scale back the image back to the intensity of 0-255 by normalizing the image in next stage of normalization.

The main requirement of the normalization stage is to normalize the intensity scale of 'S' from 0-1023 to 0-255. One simple approach could be to divide the intensity values by four, as four images were added to obtain 'S'. This approach may further blur the images, and introduce back the smudges. Thereby, a different approach is required to retain or to further increase clarity in viewing the whitish and blackish pixels, which indirectly helps in enhancing the required Aztec boundaries. Further, Histogram '$H_s$' is computed for the image 'S', obtained in the previous stage to determine peak (Maxima) in the histogram. Further, from the determined peak, the lowest points on either sides of the histogram curve are determined. Moreover, by traversing left from the peak, the lowest point (i.e., the histogram drop on the left index) may be determined.

Similarly, by traversing on the right side from the peak, the lowest point (i.e., the histogram drop on the right index) of histogram on the right side of the peak may be determined. The left index and the right index mark the boundaries of the intensity values of S, which gets mapped to the gray scale 0-255. If the intensity value of 'S' obtained in the previous stage is greater than left index and less than right index, the values which lie within the range 0-1023 are scaled to its equivalent on 0-255 scale. If the intensity value in 'S' is less than left index, the range may be retained. However, if the intensity value in 'S' is less than right index, the values may be converted directly into 255. The image obtained thereafter may be sent to the next stage for detection/identification of the Aztec code by the detection module 506.

The detection module 506 may be configured to make use of the basic properties of the Aztec codes to detect the presence of the Aztec codes in the processed image as received from the processing module 504. As it is known in the art that the Aztec barcodes have a unique pattern of concentric squares located at the center of the barcode. The unique pattern is exploited to detect if the segmented region is an Aztec barcode or not. In addition to the concentric squares, yet another unique feature of Aztec barcode is a reference grid. Reference grid is a sequence of alternate black and white pixel scan-line, starting from a common centroid and spanning in all four directions. The parts of the reference grid extend from within the finder structure to the outermost boundaries of the bar code symbol. Reference grid is part of the information encoded in the barcode. To make use of the two aforementioned characteristic features, the detection module 506 uses both the concentric squares and the reference grid to detect presence of Aztec barcode in the segmented regions of the processed image.

Further, from the property of the concentric objects, it may be stated that all the concentric objects may have a common centroid. Therefore, the detection module 506 takes the processed image and subjects it to an adaptive threshold algorithm for obtaining a binary image. Connected components in the binary image may be computed using region-growing method. Thereafter, centroid of each connected component may be calculated. Since, Aztec barcode may have two or three concentric squares, the detection module 506 may consider only those segmented regions containing two or more connected components having a common centroid. Thereby, many segmented regions that do not have the pattern may be eliminated. The regions that are selected based on the criteria (that two or more connected component have a common centroid) need to be further validated for ascertaining presence of the Aztec barcode.

Particularly, two specific properties are checked to determine if connected component is an Aztec barcode or not. First property comprises, drawing minimum bounding rectangles around each connected component having the same centroid. The slopes of the edges of all the minimum bounding rectangles must have the same slope (i.e., the edges of all the minimum bounding rectangles must be parallel to each other). Under second property, if scan-line at the common centroid is extracted along the same slope as that of the orientation of the minimum bounding rectangles, and along the direction perpendicular to the orientation, then the region must have alternate black and white pixels with same width, i.e., the reference grid.

Figure 7:
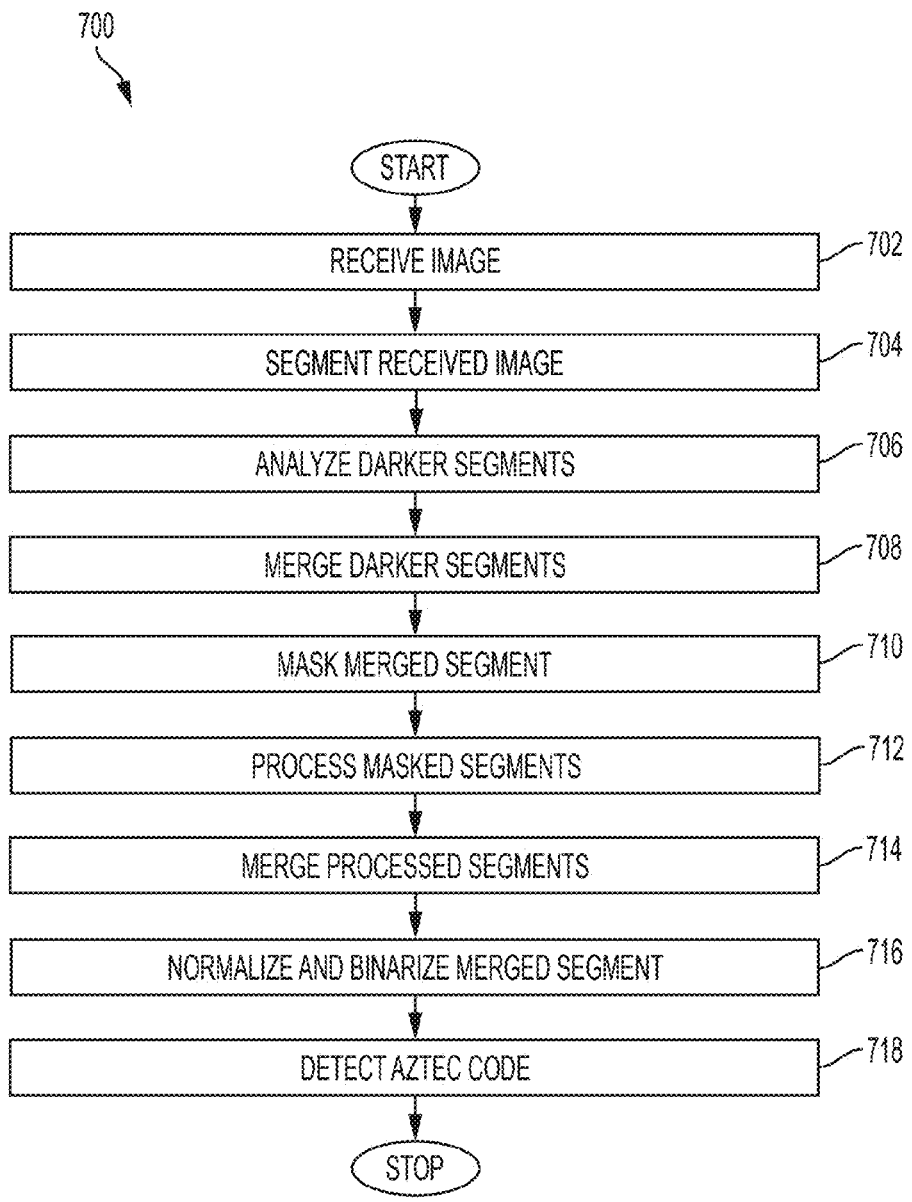
FIG. 7 illustrates a flow diagram of a method for processing an image to detect an Aztec code, in accordance with the disclosed subject matter.

FIG. 7 illustrates a flow diagram 700 of a method for processing an image to detect an Aztec code, in accordance with the disclosed subject matter. In an exemplary embodiment, the method uses two unique techniques that are to be used in localizing the Aztec barcode. First technique is a pre-processing method, which effectively processes the image by stretching the histogram or the gray intensity level difference of four gradient images (as disclosed earlier in conjunction with FIG. 5 and FIG. 6). The gradient images are obtained by applying four different masks. Although four gradient images from four different masks are disclosed in the embodiment, other embodiments intend to include or otherwise cover few or greater than four gradient images and four masks. The pre-processed image is then subjected to binarization, which provides accurate black and white blocks in the barcode. The second is the method of identifying if the detected barcode is an Aztec barcode. The exemplary method uses the property of concentric squares to identify the Aztec barcode along with the reference grid pattern. The method may further check for the common centroid present in the segmented region and identify if the pattern is an Aztec barcode or not. The exemplary method can effectively and accurately detect the smallest barcode having structural element size less than two pixels.

At step 702, a device implemented with the Aztec code reading system 502 (as disclosed earlier in conjunction with FIG. 5) receives a gray scale image having at least one Aztec code. At step 704, the device segments the received image into plurality of image segments of equal size, preferably into 20×20 zones, wherein each zone is 20 units in height and 20 units in width. Thereafter, at step 706, the device analyzes the plurality of image segments for determining image segments having higher percentage of dark color regions. More specifically, the ratio of white to black pixel is calculated in each zone. In an example, if any zone has more than 25-30 percent of black region, then that region is considered to potentially have barcode image. The percentage of black region considered to potentially have a barcode image may vary in other embodiments, and may be calibrated according to standardized image segments.

At step 708, the device merges the determined image segments together to form a segmented image having highest probability of possessing the Aztec code. Since the received image contains small Aztec barcodes that may have module size of size smaller than two pixels, the conventional binarization methods fail to retain the Aztec code finder pattern undistorted. Further, conventional binarization methods corrupt such low pixelated Aztec barcodes partially or completely. When the module size is in sub-pixels and the input image is in integral pixel, the pixel intensities spread into the neighboring pixels resulting in a pixel having partial black and partial white content, causing the pixels to shift towards gray values. Depending on the percent of white/black content in a pixel, the black pixels may be termed as white and white may be termed as black in all four directions, thereby causing errors in properly detecting and decoding the barcode.

In an example, if a module is of size 1.3 pixels, then the first pixel can be considered completely black as it has a 100% of a black pixel content, but the other 30% (0.3 out of 1.3 pixel) of its black content is spread to the next pixel (thereby forming the 1.3 pixel size). Since the second pixel is filled with 30% of black as a spillover from the first pixel, only the remaining 70% can be filled with white. As the module size is 1.3 pixels, the remaining 60% of the second module must be from the third pixel, which must also be white. Further, the remaining 40% of the third pixel must be black in color, which merge with 90% fourth pixel to give the third module. The method can proceed using this technique to create the image. In a case of the black and white color distribution in each pixel, the first pixel has 100% black, the second pixel has 30% black content and 70% white content, resulting in a gray pixel. Further, the third pixel has 60% white content and 40% black content, resulting in an overall darker gray pixel. The fourth pixel has 90% black and 10% white content, resulting in a greater intensity of darker gray pixel. Therefore, the pixel pattern that should be alternative black and white has turned to gray values, which when binarized may result in a false binarization. This is due to integral nature of pixels in input image and it happens in all four directions, resulting in loss of information or degradation. Therefore, the embodiments can advantageously remove smudges from the segmented image, at step 710.

At step 710, the device masks the segmented image by plurality of masks to obtain plurality of gradient images. More specifically, the segmented region is inverted for processing to view concentric squares as white instead of black. To eliminate the smudges, four different masks in both horizontal and vertical directions are convoluted with the intensity inverted/negated segmented region. The masks used to obtain vertical/horizontal edges along with the four corners are shown in FIG. 6, column 1 (c1) and column 2 (c2). When these masks are applied on the input image, the prominent edges are obtained and the smudges are eliminated. This step provides four gradient images, however other embodiments can use greater or fewer than four masks to produce greater or fewer, respectively, gradient images.

At step 712, the device processes the plurality of gradient images (four images) to widen the separation between dark colored pixels and light colored pixels. More specifically, the image is enhanced by increasing the separation between the whitish (lighter) and blackish (darker) gray levels, i.e., the gray value nearer to black is made to move towards black and the gray value nearer to white is made to move further towards white. To achieve this, histograms for all four gradient images may be computed. From the histograms, first maxima and second maxima for each histogram may be computed. It is ensured that the two maxima's are not situated on the same peak, and are at considerable distance to be the representative of the two different peaks in the histogram.

Once these maxima's are computed, the lowest point of the histogram curve lying in between these two maxima is determined, which is considered to be the minima point. If the intensity value of the input gradient image is less than minima, the pixel intensity is further reduced by a constant t (arbitrary value that may be experimentally determined). Otherwise, if the intensity is greater than the minima, the intensity is further increased by a value t. This process widens the separation between the whitish pixels and the blackish pixels, providing a greater discrimination to the white and black content of the pixels. This process is repeated on all the four gradient images obtained in the previous step.

At step 714, the device merges (adds) the processed gradient images together to form a processed image 'S'. This merging step can be accomplished in one embodiment using a matrix addition. As the enhanced gradient image is still a gray-scale image, with the intensity values ranging from 0-255, adding all four enhanced gradient images may scale-up the intensity values of S to a range 0-1023. Therefore, at step 716, the device reduces pixel intensity of the processed image to form a normalized image having pixel intensity equivalent to any of the gradient images. In addition, the image is binarized for detection of the Aztec code in the final step 718.

In one embodiment, the main requirement of the step 716 is to normalize the intensity scale of S from 0-1023 to 0-255. Therefore, Histogram $H_s$ is computed for the image S, obtained in the previous step. Thereafter, the peak (Maxima) in the histogram is determined. From the determined peak, the lowest points on either sides of the histogram curve are determined. From the peak, traverse left and determine the lowest point, i.e., the histogram drop on the left (say left index). Similarly, traverse on the right side from the peak and determine right index, i.e., lowest point of histogram on the right side of the peak. The left index and the right index mark the boundaries of the intensity values of S, which gets mapped to the gray scale 0-255. If the intensity value of S obtained in the previous stage is greater than left index and less than right index, scale the values which lie within the range 0-1023 to its equivalent on 0-255 scale. If the intensity value in S is less than left index, retain it as it is and if it is greater than right index convert the values directly into 255.

At step 718, the device analyzes the normalized and binarized image to identify the Aztec code. Since the Aztec barcodes have a unique pattern of concentric squares located at the center of the barcode, this feature is analyzed to detect if the segmented region is an Aztec barcode or not. In addition to the concentric squares, yet another unique feature of Aztec barcode is the reference grid. Reference grid is a sequence of alternate black and white pixel scan-lines, starting from the common centroid and spanning in all four directions. The parts of this reference grid extend from within the finder structure to the outermost boundaries of the bar code symbol. The reference grid is part of the information encoded in the barcode.

Figure 8:
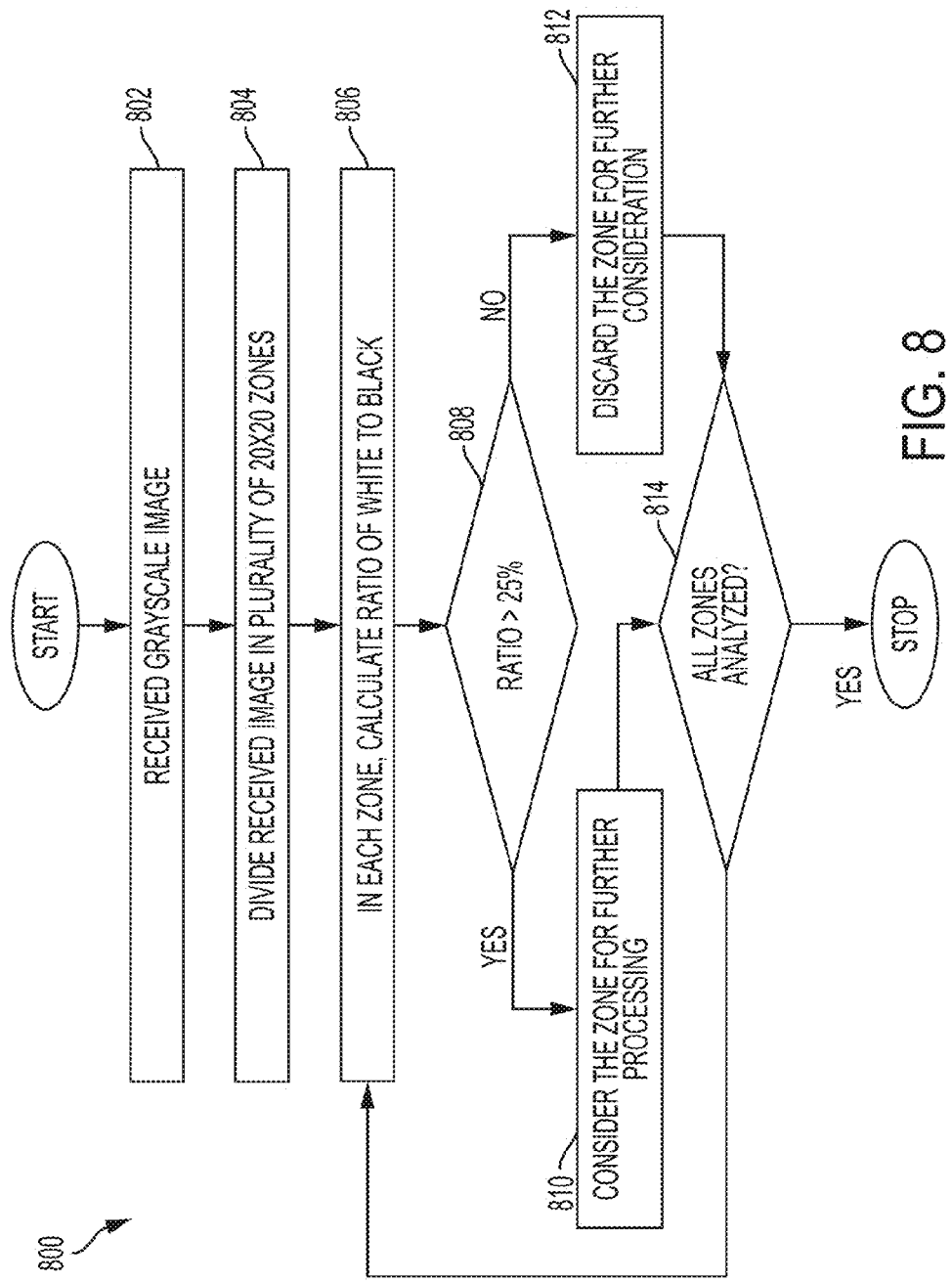
FIG. 8 illustrates a flow diagram of a method for performing coarse segmentation on a low-resolution image to detect an Aztec code, in accordance with the disclosed subject matter.

FIG. 8 illustrates a flow diagram 800 of a method for performing coarse segmentation on a low resolution image to detect an Aztec code, in accordance with the disclosed subject matter. At step 802, a low resolution image is received in grayscale format. At step 804, the received image comprises the Aztec code along with other content such as text and other graphical pictures. Coarse segmentation process is performed on the received image using a zonal method, which works on the basis of darker domination.

At step 804, the received image is divided into 20×20 size zones, i.e., each zone will be of size width/20 and height/20 units. Thereafter, at step 806, ratio of white to black pixel is calculated in each zone. At step 808, if any zone is detected having more than 25-30 percent of black region then that region is considered to potentially have barcode image (illustrated as step 810). Otherwise, the zone is discarded from further consideration (illustrated as step 812). This process continues at step 814, unless all zones are analyzed. In an exemplary embodiment, based on coherent property and adjacent property, all the zones identified as potential barcode regions are merged together. This merged region is expected to be comprising the Aztec code, which needs further processing for interpretation of data stored therein.

It will be appreciated that several of the above-disclosed and other features and functions, or alternatives thereof, may be desirably combined into many other different systems or applications. Various presently unforeseen or unanticipated alternatives, modifications, variations, or improvements therein may subsequently be made by those skilled in the art, which are also intended to be encompassed by the following claims.

What is claimed is:

1. A method for processing an image to identify an aztec code, the method comprising:
    segmenting the image into plurality of image segments of equal size;
    analyzing the plurality of image segments to determine image segments having higher percentage of dark color regions;
    merging the determined image segments together to form a segmented image;
    masking the segmented image by plurality of masks to obtain plurality of gradient images;
    processing the plurality of gradient images to widen separation between dark color pixels and light color pixels;
    merging the processed gradient images together to form a processed image;
    reducing pixel intensity of the processed image to form a normalized image; and
    binarizing the normalized image to obtain only black and white color pixels in binarized image.

2. The method of claim 1, wherein resolution of the aztec code is less than 2 pixels.

3. The method of claim 1, wherein the received image is a gray scale image.

4. The method of claim 1, wherein the segments of equal size each comprise 20×20 segments.

5. The method of claim 1, wherein the higher percentage of dark color regions comprises at least 25% of dark color region.

6. The method of claim 1, wherein the segmented region is masked by at least four different masks.

7. The method of claim 1, wherein the plurality of masks are convoluted by inverting the segmented images in vertical and horizontal directions.

8. The method of claim 1, wherein the separation between dark color pixels and light color pixels is obtained by changing pixel intensity of the gradient images up to a threshold level.

9. The method of claim 1, wherein pixel intensity value of the gradient image is 0-255.

10. The method of claim 1, wherein pixel intensity value of the processed image is 0-1023.

11. The method of claim 1, wherein pixel intensity value of the normalized image is 0-255.

12. The method of claim 1, wherein processing of the normalized image comprises identifying a concentric squares pattern.

13. The method of claim 1, wherein processing of the normalized image comprises identifying a reference grid pattern.

14. The method of claim 13, wherein the reference grid pattern comprises a sequence of alternate black and white color pixels starting from a common centroid.

15. The method of claim 1, wherein the normalized image comprises pixel intensity equivalent to the gradient image.

16. The method of claim 1 further comprising analyzing the binarized image to identify the Aztec code.

17. An electronic device for capturing and processing an image to identify an aztec code in the captured image, the electronic device comprising:
    a processor; and
    a memory comprising instructions, which when executed by the processor, cause the processor of the electronic device to:
        segment the captured image into plurality of equal size image segments;
        analyze the plurality of image segments to determine image segments having higher percentage of dark color regions therein;
        merge the determined image segments together to form a segmented image;
        mask the segmented image by plurality of masks to obtain plurality of gradient images;
        process the plurality of gradient images to widen separation between dark color pixels and light color pixels;
        merge the processed gradient images together to form a processed image;
        reduce pixel intensity of the processed image to form a normalized image; and
        binarize the normalized image to obtain only black and white color pixels in binarized image.

18. The electronic device of claim 17, wherein the normalized image comprises pixel intensity equivalent to the gradient image.

19. The electronic device of claim 17, wherein the memory further comprises instructions to analyze the binarized image for identifying the Aztec code.

20. A computer-readable medium containing programming instructions for processing an image to detect an aztec code, the programming instructions when executed, cause a processor of an electronic device to:
- segment the image into plurality of image segments of equal size;
- analyze the plurality of image segments to determine image segments having higher percentage of dark color regions;
- merge the determined image segments together to form a segmented image;
- mask the segmented image by plurality of masks to obtain plurality of gradient images;
- process the plurality of gradient images to widen separation between dark color pixels and light color pixels;
- merge the processed gradient images together to form a processed image;
- reduce pixel intensity of the processed image to form a normalized image; and
- binarize the normalized image to obtain only black and white color pixels in binarized image.

21. The computer-readable medium of claim 20, wherein the normalized image comprises pixel intensity equivalent to the gradient image.

22. The computer-readable medium of claim 20 further comprises instructions to analyze the binarized image for identifying the aztec code.

* * * * *